United States Patent [19]

Toyoshima

[11] 4,063,260
[45] Dec. 13, 1977

[54] CAMERA WITH AN INTERNALLY ARRANGED ELECTRONIC FLASH DEVICE

[75] Inventor: Sakae Toyoshima, Hirakata, Japan

[73] Assignee: West Electric Company, Ltd., Osaka, Japan

[21] Appl. No.: 640,968

[22] Filed: Dec. 15, 1975

Related U.S. Application Data

[63] Continuation of Ser. No. 425,859, Dec. 18, 1973, abandoned.

[30] Foreign Application Priority Data

Dec. 20, 1972 Japan .............................. 47-128510

[51] Int. Cl.² .......................... G03B 15/05; G03B 9/04
[52] U.S. Cl. .................................... 354/149; 354/196; 354/270
[58] Field of Search ...................... 354/196, 149, 270; 240/1.3

[56] References Cited

U.S. PATENT DOCUMENTS

| | | | |
|---|---|---|---|
| 2,380,216 | 7/1945 | Carter | 354/270 |
| 3,171,337 | 3/1965 | Fischer | 354/139 X |
| 3,443,498 | 5/1969 | Bihlmaier | 354/149 X |
| 3,447,441 | 6/1969 | Ort | 354/196 |
| 3,535,990 | 10/1970 | Kunze | 354/128 |

*Primary Examiner*—L. T. Hix
*Assistant Examiner*—Kenneth C. Hutchison
*Attorney, Agent, or Firm*—Stevens, Davis, Miller & Mosher

[57] ABSTRACT

A camera with an internally arranged electronic flash device in which there is arranged a distance control knob releasably interlocking with a power source switch of the flash device. When the object to be photographed needs the flash device under conditions of low luminance the power source switch is moved to a suitable position indicating a particular distance between the object and the camera while the power source switch is moved into the "ON" position. When the photograph is taken with natural light the distance control knob is operated independently of the power source switch.

5 Claims, 2 Drawing Figures

CAMERA WITH AN INTERNALLY ARRANGED ELECTRONIC FLASH DEVICE

This is a continuation of application Ser. No. 425,859 filed Dec. 18, 1973 now abandoned.

DETAILED DESCRIPTION OF INVENTION

The present invention relates to a camera with an internally arranged electronic flash device.

When an object is to be photographed with a flash device under conditions of low luminance, a variety of methods have heretofore been employed to obtain a proper exposure.

For instance, after having turned on the power source switch of the flash device, a value of the diaphragm corresponding to the distance from the camera to the object being photographed is calculated depending on the guide number on the flash device by using the following formula:

Diaphragm value = Guide number/Distance between camera and object

Then, the diaphragm ring of camera is set to the proper value of the diaphragm thus obtained for carrying out the photography. In another method, a flash device which automatically controls the quantity of light produced thereby is employed to attain a proper exposure.

In the former method, it is very troublesome and requires a specialized knowledge of flash photography to calculate the value of the diaphragm depending on the guide number, which is necessary each time a flash is required. Thus, the camera man very often forgets to change the old value of the diaphragm to a new value in spite of the variation of distance incidental to the next photograph. Due to this error, the new action naturally leads to a failure.

In the latter method, a complicated electric circuit is required since the quantity of light produced by the flash device must be automatically controlled, and such arrangement results in a high manufacturing cost.

The present invention is intended to eliminate such disadvantages as described above and provides a camera with an electronic flash device in which there is arranged a distance control knob interlocking with a power source switch of the flash device. When the object to be photographed needs the flash device under conditions of low luminance a proper exposure can be obtained very simply by stopping only the movement of the power source switch on its arrival at a suitable position indicating the particular distance between the object and the camera while the power source switch interlocking with the distance control knob is moved to the "ON" position.

Figure 1:
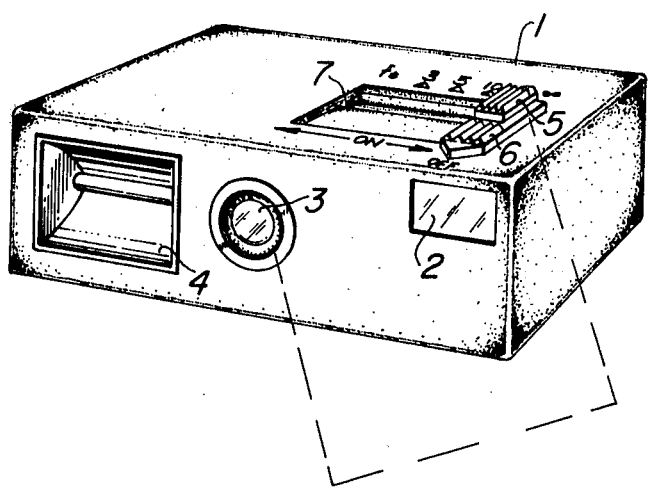
Figure 2:
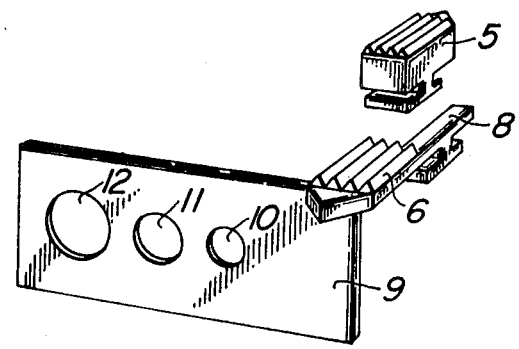

The object and features of the present invention will become more clear by the following description of the preferred embodiment taking reference with the attached drawings, in which:

FIG. 1 is a perspective view showing the appearance of a camera with an electronic flash device therein in accordance with the present invention; and FIG. 2 is a view illustrating an exposure selection mechanism.

Referring to FIG. 1, the numerals 1, 2, 3 and 4 indicate respectively a camera body, a view finder, an objective lens, and a flashing section of a flashing device. The numeral 5 designates a distance control knob interlocking with a mechanism for controlling the focal length of the objective lens 3 (not shown). The distance control knob 5 is so constructed that, when the photograph is taken under natural light without using the flash device, the distance control knob 5 is separated from a power source switch knob 6 to slide in a sliding groove 7 in order to operate said focal length control mechanism, so that the focusing of the lens 3 can be carried out by, for example, moving the lens 3 forward and backward.

Turning to FIG. 2, an exposure selection plate 9 having exposure control sections 10, 11 and 12 is attached to the power source switch knob 6 of the flash device and comprises diaphragm holes, neutral density filters with various densities and the like for obtaining a proper exposure under circumstances of a particular distance between the camera and the object corresponding to the quantity of light produced by the flash device.

Hereinafter explanation will be made of the operation of the flash camera apparatus in accordance with the present invention at the time of taking a photograph.

In the case where an object under a high luminance condition is photographed by utilizing only natural light:

First, the power source switch knob 6 of the flash device is placed in the "OFF" position. Then, the distance control knob 5 is slid in the slide groove 7 and is set to a desired position corresponding to the particular distance from the camera to the object to be photographed, and there can be easily selected the factors such as shutter speed and the like corresponding to the particular exposure conditions.

In the case where a flash is necessary to photograph an object under a low luminance condition:

The power source switch knob 6 of the flash device is moved into the "ON" position so that the distance control knob 5 simultaneously slides in the sliding groove 7 by means of an arm portion 8 of the power source switch knob 6. When the distance control knob 5 reaches a position indicating the particular distance between the camera and the object to be photographed, the movement of the power source switch knob 6 is terminated to start the flashing operation of the flash section 4.

At this time, the diaphragm holes or filters having different densities provided in the selection plate 9 operate in an interlocking manner with the power source switch knob 6 to attain a proper exposure corresponding to the particular distance between the camera and the object. In this case, taking into consideration both the amount of light produced by the flash section 4 of the flash device and the distance from the camera to the object to be photographed, each appropriate diaphragm hole or filter is previously defined corresponding to the three varieties of distances:

the diaphragm hole or filter 12 for the distance of 10 m, the diaphragm hole or filter 11 for the distance of 5 m, and the diaphragm hole or filter 10 for the distance of 3 m.

As has been described in the foregoing, the present invention has a number of advantages such as being able to obtain very simply and automatically a proper exposure, because in the present invention, when a photograph is taken under conditions of natural light, the distance control knob is operated independently, and when a photograph is taken by using a flash, the power source switch of the flash device is moved into the "ON" position with the distance control knob simultaneously in an interlocking manner for selecting a diaphragm hole or filter corresponding to the particular distance between the camera and the object to be photographed.

What is claimed is:

1. A photographic camera having a built-in electronic flash device and a power source connectable to the flash device, comprising:
   a. a housing having a groove;
   b. a photographic objective lens within said housing, said lens being movable forward and backward along an optical axis of said lens;
   c. first knob means slidably movable along said groove for actuating focus adjusting means for moving said lens along said optical axis;
   d. second knob means slidably movable along said groove between ON and OFF positions, said second knob means when moved to said ON position connecting said power source to said flash device and disconnecting said power source from said flash device when in the OFF position, said second knob means having an arm for slidably moving said first knob means simultaneously with said second knob means when said second knob means is moved along said groove within the ON position range; and
   e. means operatively connected to said second knob means for selecting the rate of passage of light to said lens; said first knob means sliding within said groove when said second knob means is moved to said ON position thereby actuating said focus adjusting means to provide focal adjustment and said means for selecting the rate of passage of light to said lens simultaneously with connection of said power source to said flash device, said first knob means being slidable solely along said groove when said second knob means is at said OFF position.

2. A photographic camera as claimed in claim 1, wherein said means for selecting the rate of passage of light to said lens includes a diaphragm having a plurality of apertures of different diameters movable into said optical axis to provide a proper exposure.

3. A photographic camera according to claim 2 wherein said apertures include filters having different color densities.

4. A photographic camera according to claim 2 wherein said first and second knob means have ridges separated by depressions on their top surface to enable said knob means to be moved easily in said groove.

5. A photographic camera according to claim 4 wherein said apertures have sequentially decreasing diameters from one end of said diaphragm plate to the other end thereof.

* * * * *